(12) United States Patent
Huang et al.

(10) Patent No.: US 6,532,137 B2
(45) Date of Patent: Mar. 11, 2003

(54) HEAD ASSEMBLY, DISK DRIVE APPARATUS, HARD DISK DRIVE AND METHOD FOR MANUFACTURING DISK DRIVE APPARATUS

(75) Inventors: Fu-Ying Huang, San Jose, CA (US); Mutsuro Ohta, Yokohama (JP); Keishi Takahashi, Fujisawa (JP); Kohichi Takeuchi, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/996,248

(22) Filed: Nov. 28, 2001

(65) Prior Publication Data

US 2002/0063999 A1 May 30, 2002

(30) Foreign Application Priority Data

Nov. 29, 2000 (JP) ........................................ 2000-363528

(51) Int. Cl.[7] .............................................. G11B 21/08
(52) U.S. Cl. .................................................. 360/265.7
(58) Field of Search ........................... 360/265.7, 265.8, 360/265.6, 266.1, 264.4, 264.8, 264.1, 264.2, 265.9; 369/250, 44.16, 44.19

(56) References Cited

U.S. PATENT DOCUMENTS

| | | | | |
|---|---|---|---|---|
| 4,302,834 A | * | 11/1981 | Pretto | ........................ 369/250 |
| 5,432,763 A | * | 7/1995 | Campbell et al. | ........ 369/44.19 |
| 5,461,598 A | * | 10/1995 | Marchant et al. | ........ 369/44.16 |

* cited by examiner

*Primary Examiner*—Allen Cao
(74) *Attorney, Agent, or Firm*—Robert B. Martin; Bracewell & Patterson, L.L.P.

(57) ABSTRACT

A disk drive head assembly enables adjustment of a center of gravity of the head assembly of a depopulation version, while suppressing an occurrence of a resonance frequency affecting the performance of the disk drive apparatus. The head assembly for the data storage media includes: magnetic heads for reading/writing data from/to the data storage media, arms to which the magnetic heads are attached, a pivot shaft holder for supporting the arms, a coil for a voice coil motor extended from the pivot shaft holder, and a counter weight provided at a predetermined position opposite to a coil for the voice coil motor with respect to the pivot shaft holder.

10 Claims, 8 Drawing Sheets

HEAD ASSEMBLY, DISK DRIVE APPARATUS, HARD DISK DRIVE AND METHOD FOR MANUFACTURING DISK DRIVE APPARATUS

This application claims the priority benefit of Japanese Patent Application No. 2000-363,528 filed on Nov. 29, 2000, and entitled "Disk Drive Apparatus, Hard Disk Drive, Filter and Method for Inspecting Disk Drive Apparatus."

BACKGROUND OF THE INVENTION

1. Field of the Invention

The present invention relates to a disk drive apparatus suitable for the hard disk drive (hereinafter, HDD) used as data storage means for computers, and particularly to a head assembly for reading/writing data from/to magnetic disk.

2. Background Art

The HDD, which is the most conventional data storage means for computers, has a structure in which a single or a plurality of magnetic disks are coaxially arranged and driven by a spindle motor. Data recording and writing are carried out by a magnetic head provided opposite to said magnetic disk, which is swung by an actuator, usually a voice coil motor (hereinafter, VCM). The above magnetic disks, magnetic head, and actuator are accommodated in a housing called a disk enclosure. The disk enclosure is formed of a base made of an aluminum alloy shaped in a thin case, and a top cover for sealing the opening of the base.

The storage capacity of a HDD depends on the specification of the computer on which it is mounted, and usually it has a single or plurality of magnetic disks to satisfy the storage capacity. For instance, if the storage capacity demanded of the HDD is 30 GB (gigabytes), three magnetic disks each having a storage capacity of 10 GB are prepared. However, there are various computer specifications, and a product having a HDD of 10 GB also exists. In this case, the disk enclosure and other parts are unified to support a plurality of storage capacities. For instance, the disk enclosure and other parts are previously designed so that a maximum of three magnetic disks each of 10 GB are mounted namely, an HDD of 30 GB is formed, and three magnetic disks are mounted if the required storage capacity is 30 GB, two disks are mounted for 20 GB, and one disk is mounted for 10 GB. Three magnetic disks can be mounted on this HDD, and the HDD that actually has three magnetic disks mounted thereon is called the full population version, while the HDD that actually has two or one disk mounted thereon is called the depopulation version.

In the depopulation version, the number of magnetic disks to be mounted on the HDD is increased or decreased according to the required storage capacity. Then, the number of magnetic heads for reading/writing data from/to magnetic disks is increased or decreased according to the number of magnetic disks. For instance, four magnetic heads are provided if the number of magnetic disks is two, and two magnetic heads are provided if the number of magnetic disks is one. If the number of magnetic heads is decreased, the weight decreases accordingly, which results in deviation of the center of gravity of the actuators to which the magnetic heads are attached. Thus, usually dummy heads are attached to the actuators to maintain their center of gravity.

3. Problems to be Solved by the Invention

Figure 5:
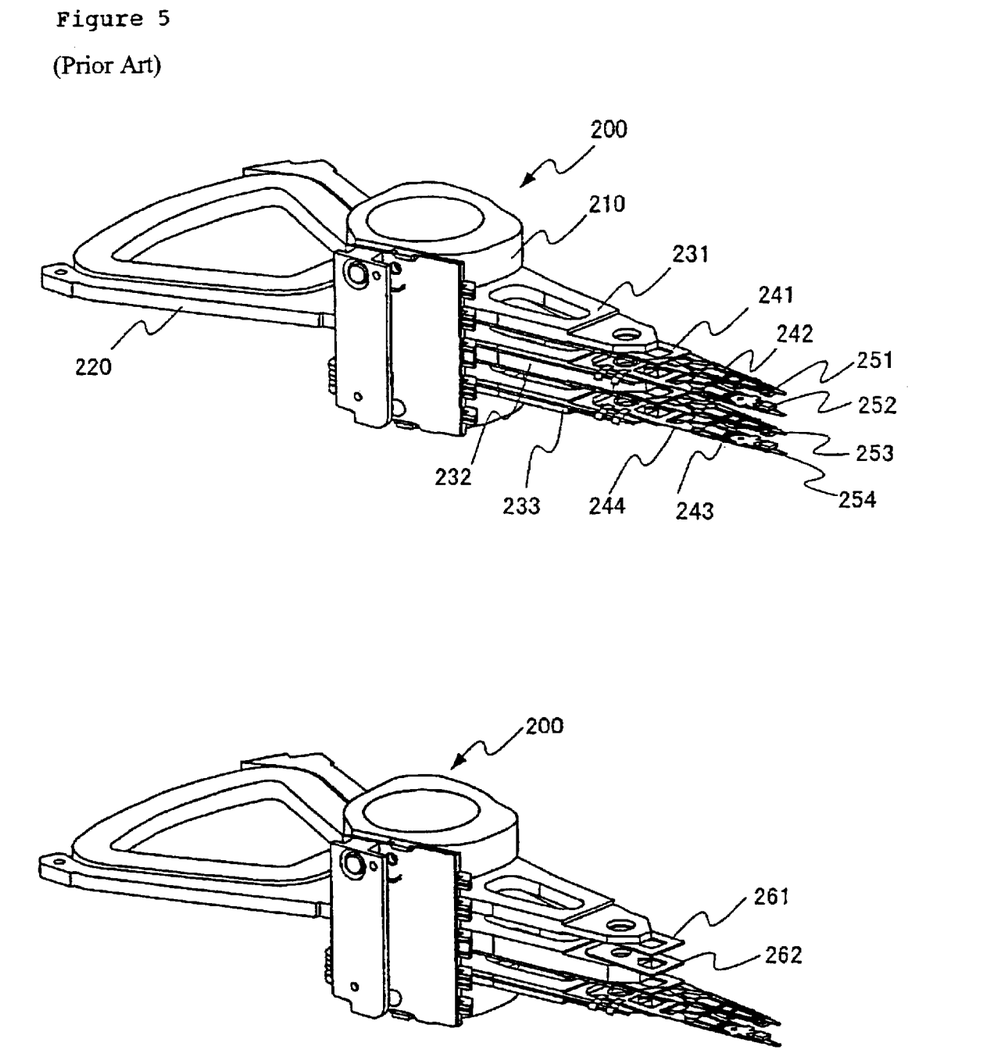
FIG. 5 is a perspective view showing the head assembly using a conventional dummy head.

By attaching dummy heads, the center of gravity of the actuators including magnetic heads, or of the head assembly can also be made to match the swing shaft in the depopulation version. It is important to cause the center of gravity of the head assembly to match its swing shaft for increasing the accuracy of the magnetic head positioning. FIG. 5 is a perspective view showing the conventional head assembly using dummy heads. In FIG. 5, a head assembly 200 has, as the main structural elements of it, a pivot shaft holder 210, a coil 220 for VCM (voice coil motor) which is attached to the pivot shaft holder 210, arms 231–233 which are attached at positions symmetrical to the coil 220 for VCM with respect to the pivot shaft, suspension arms 241–244 which are attached to the end portions of the arms 231–233, and magnetic heads 251–254 which are attached to the end portions of the suspension arms 241–244.

It is assumed that the head assembly 200 performs data read/write for the HDD having two magnetic disks mounted or the HDD having one magnetic disk mounted as the depopulation version. For the HDD of the full population version on which two magnetic disks are mounted, as shown in the upper portion of FIG. 5, the four suspension arms 241–244 respectively having the magnetic heads 251–254 attached thereto are attached to the arms 231–233. On the other hand, for the HDD of the depopulation version on which only one magnetic disk is mounted, as shown in the lower portion of FIG. 5, dummy heads 261 and 262 are attached where the suspension arms 241 and 242 are to be attached.

The head assembly 200, in which the four suspension arms 241–244 are attached to the arms 231–233, and the head assembly 200, in which the two dummy heads 261 and 262 are attached, are both designed so that the center of gravity matches the swing shaft. However, by attaching the dummy heads 261 and 262, a further resonance frequency affecting the performance of the HDD may occur in the head assembly 200. Accordingly, it is required to adjust the center of gravity of the head assembly 200 without attaching the dummy heads 261 and 262.

In Published Unexamined Utility Model Application No. 5-36655 Specification, there is disclosed a technique for adjusting the center of gravity of a head assembly. In the head assembly disclosed in Published Unexamined Utility Model Application No. 5-36655, a counter weight is fixed by a screw between the pivot shaft and the coil for VCM. However, the technique disclosed in Published Unexamined Utility Model Application No. 5-36655 is primarily intended to adjust the position of the center of gravity if the center of gravity deviates from the swing center of the head assembly. That is, it is not intended to adjust the center of gravity of the depopulation version head assembly.

Accordingly, it is an object of the present invention to provide a head assembly which enables the adjustment of its center of gravity for the depopulation version, while suppressing the occurrence of a resonance frequency affecting the performance of the disk drive apparatus.

SUMMARY OF THE INVENTION

In one embodiment of the present invention, the problems described above are solved by attaching a counter weight for adjusting the center of gravity of the head assembly of the depopulation version at a specific position on the head assembly. Accordingly, the present invention is a head assembly swinging over data storage media, the head assembly comprising a head for reading/writing data from/to the data storage media, an arm to which the head is attached, a swing shaft for supporting the arm, a coil for voice coil motor extended from the swing shaft, and a counter weight set at a predetermined position on the swing shaft which is on the side opposite to the coil for voice coil motor with respect to the swing shaft.

Since the counter weight is provided on the swing shaft, the head assembly of the present invention can reduce the occurrence of the vibration due to swing motion as compared with the dummy head attached to the arm, thereby to suppress the occurrence of a resonance frequency affecting the performance of the disk drive apparatus. Further, in the head assembly of the present invention, the counter weight is provided on the side opposite to the coil for the voice coil motor with respect to the swing shaft. This suggests that the counter weight is attached for the depopulation version, but it is not attached for the full population version, as detailed in the section of embodiments.

In the depopulation version, the number of data storage media is reduced from the full population version, and the number of heads is reduced accordingly. Thus, if the head assembly of the present invention is applied to the depopulation version, a plurality of the arms is provided, and there are existing arms to which the head is attached, and arms to which the arm is not attached.

Further, in the head assembly of the present invention, the counter weight can be detachably provided in the swing shaft. Generally, the full population version and the depopulation version share components with one another. This is also the case for the head assembly. Accordingly, if the full population version and the depopulation version share the head assembly, and the counter weight is detachable, then it is only needed to attach the counter weight only for the depopulation version.

Further, in accordance with the present invention, there is provided a head assembly swinging over data storage media, including: a swing shaft as the center of the swing motion; a coil for voice coil motor extended from the swing shaft; an arm extended from the swing shaft in the direction opposite to the coil for voice coil motor; a head attached to the arm for reading/writing data from/to the data storage media; and a counter weight set at a predetermined position on the swing shaft where it gives a moment to the swing shaft in the direction opposite to the direction of the moment effected by the coil for voice coil motor.

In accordance with the head assembly of the present invention, since the counter weight is also provided on the swing shaft, the occurrence of vibration due to the swing motion can be reduced, as compared with the dummy head attached to the arm, and the occurrence of a resonance frequency affecting the performance of the disk drive apparatus can be reduced. The counter weight of the present invention gives a moment in the direction opposite to the direction of the moment effected by the coil for voice coil motor. Accordingly, if the head assembly is of the depopulation version, the positional deviation of the center of gravity caused by the reduction of the magnetic heads can be suppressed.

The present invention provides a disk drive apparatus to which the head assembly of the present invention is applied. That is, the disk drive apparatus of the present invention is a disk drive apparatus in which an N (a positive integer) number of disk-like data storage media can be attached, comprising, an n (a positive integer smaller than N) number of the data storage media, and a swing-type head assembly for reading/writing data from/to the data storage media, the head assembly including, a head for reading/writing data from/to the data storage media, an arm to which the head is attached, a swing shaft for supporting the arm, a coil for voice coil motor extended from the swing shaft, and a counter weight provided on the swing shaft.

The disk drive apparatus of the present invention enables an N (a positive integer) number of data storage media to be attached, but the number of data storage media to be actually attached is n that is smaller than N. Accordingly, the disk drive apparatus includes the depopulation version. Thus, in this case, the heads are attached in a number of 2n. And, since the disk drive apparatus of the present invention allows a counter weight to be provided in the swing shaft in the depopulation version, the occurrence of vibration due to the swing motion can be reduced as compared with the dummy head attached to the arm, and the generation of a resonance frequency affecting the performance of the disk drive apparatus can be suppressed. In addition, the counter weight need not be attached for the full population version. In the disk drive apparatus of the present invention, the counter weight can be set at a position where it gives a moment to the swing shaft in the direction opposite to the direction of the moment effected by the coil for voice coil motor.

Further, in the disk drive apparatus of the present invention, the counter weight can be formed of a single member. The conventional dummy heads are attached in a number corresponding to the heads reduced in the depopulation version as compared with the full population version. On the other hand, in the present invention, the counter weight can be formed of a single member, and thus it is more easily attached as compared with the dummy head.

Further, the present invention provides a hard disk drive in which an N (a positive integer) number of magnetic disks can be attached, including, an n (a positive integer smaller than N) number of the magnetic disks, and a swing-type head assembly for reading/writing data from/to the magnetic disks, the head assembly including, a 2n number of magnetic heads for reading/writing data from/to the magnetic disks, an arm to which the 2N number of magnetic heads can be attached, a swing shaft for supporting the arm, a coil for voice coil motor extended from the swing shaft, and a counter weight set on the swing shaft for giving the same moment of inertia as given when the 2N number of magnetic heads are attached.

Also in the hard disk drive, a counter weight is provided in the swing shaft, so the generation of vibration due to the swing motion can be reduced as compared with the dummy head attached to the arm. And, since the counter weight gives a moment of inertia similar to the full population version in which the 2N number of magnetic disks are attached, it can correct the deviation of the center of gravity in the depopulation version.

Further, the present invention provides a hard disk drive for which the number of magnetic heads for reading/writing data is reduced from that for the hard disk drive as standard, including a magnetic disk for storing data, a head assembly having the magnetic disk and moving above the magnetic disk by swinging around the swing shaft, and a counter weight set in the vicinity of the swing shaft for adjusting the center of gravity of the head assembly. In the hard disk drive of the present invention, since the counter weight is provided in the vicinity of the swing shaft, the occurrence of vibration due to the swing motion can be reduced as compared with the dummy head attached to the arm. In the hard disk drive of the present invention, the counter weight can be specified not to increase the inertia of the head assembly attached to the hard disk drive as standard.

The present invention also provides a method for manufacturing the disk drive apparatus described above. That is, the method for manufacturing a disk drive apparatus of the present invention is a method for manufacturing a disk drive apparatus comprising disk-like media for storing data and a swing-type head assembly for reading/writing data from/to the disk-like media, the disk drive apparatus being capable of having an N (a positive integer) number of said disk-like media stacked therein, the method including the steps of attaching in the vicinity of the swing shaft a counter weight for causing the swing shaft to match the center of gravity in the head assembly if an n (a positive integer smaller than N) number of the disk-like media are stacked, and omitting the attaching of the counter weight if the N number of disk-like media are stacked.

In the method for manufacturing a disk drive apparatus of the present invention, the head assembly has a head for reading/writing data from/to the disk-like media, an arm to which the head is attached, and a swing shaft for supporting the arm, and if the n (a positive integer smaller than N) number of disk-like media are stacked, the counter weight is attached at a predetermined position on the swing shaft where a moment is given in the same direction as the moment caused to act on the swing shaft by the arm.

BRIEF DESCRIPTION OF THE DRAWINGS

So that the manner in which the features, advantages and objects of the present invention, as well as others which will become apparent, are attained and can be understood in more detail, more particular description of the present invention briefly summarized above may be had by reference to the embodiment thereof which is illustrated in the appended drawings, which drawings form a part of this specification. It is to be noted, however, that the drawings illustrate only a preferred embodiment of the present invention and is therefore not to be considered limiting of its scope as the present invention may admit to other equally effective embodiments.

DETAILED DESCRIPTION OF THE PREFERRED EMBODIMENT

Figure 1:
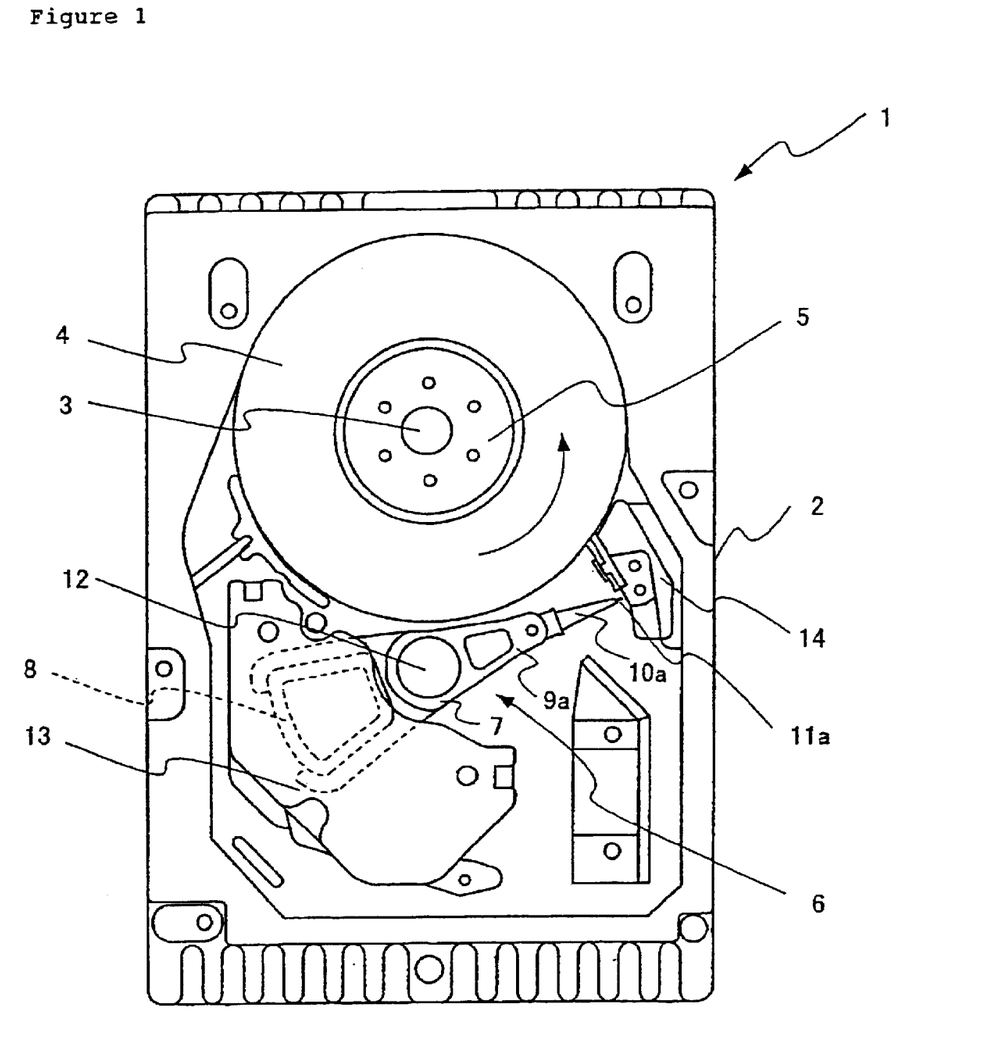
FIG. 1 is a plan view showing an HDD according to the embodiment.
Figure 2:
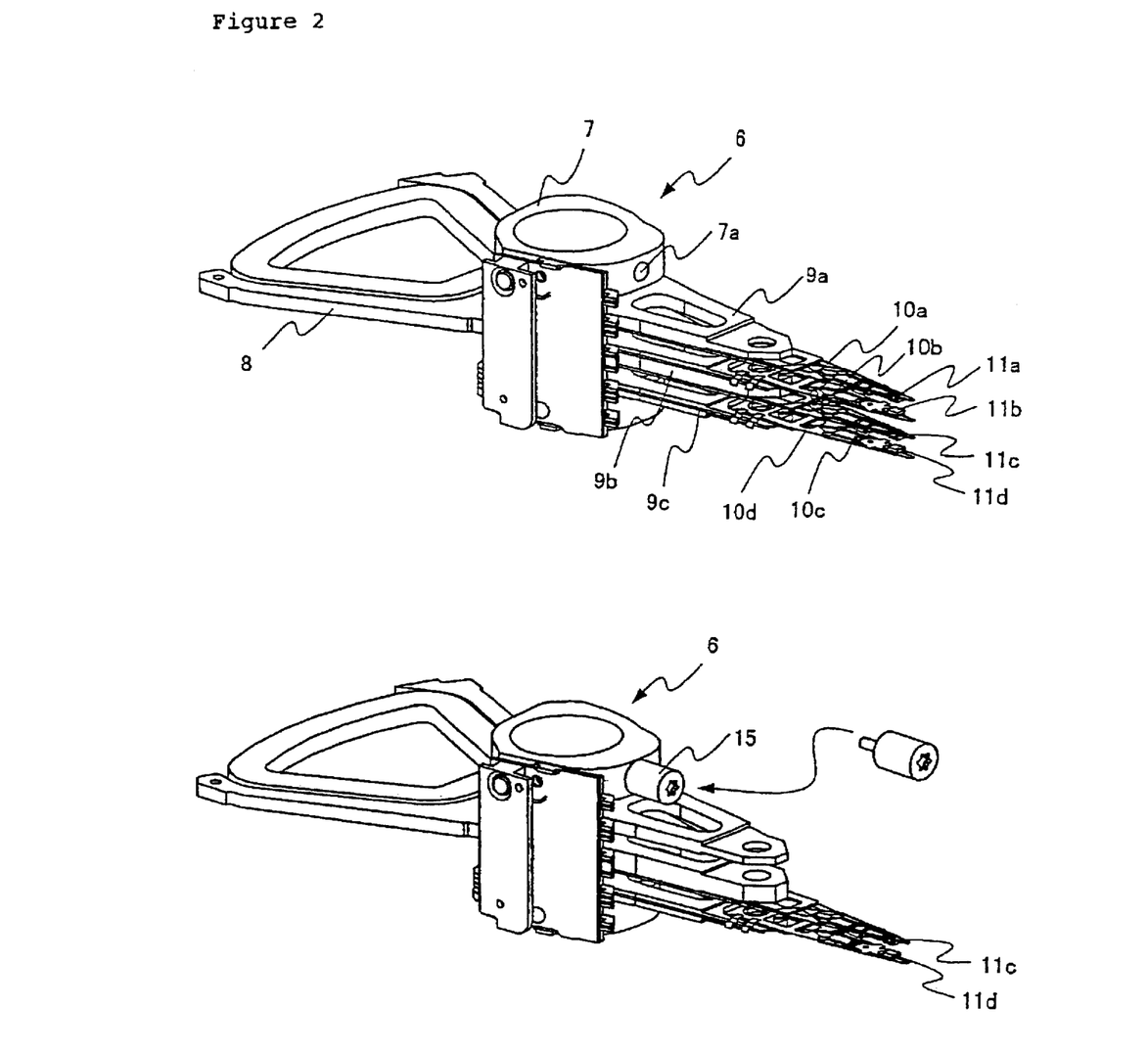
FIG. 2 is a perspective view showing a head assembly according to the embodiment.

The embodiment in which the present invention is applied to the HDD is described in detail with respect to the accompanying drawings. FIG. 1 is a plan view showing a schematic construction of the HDD according to this embodiment, and FIG. 2 is a perspective view showing a head assembly 6 according to this embodiment. FIG. 1 illustrates a hard disk drive (HDD) 1 according to this embodiment. The HDD 1 is a head load/unload type HDD. As shown in FIG. 1, in the HDD 1, a disk enclosure is formed by sealing the opened top portion of a shallow case-type base 2 made of an aluminum alloy with a top cover, not shown.

In the center of the base 2, a spindle motor (not shown) of a hub-in structure is provided. On the upper surface of the spindle motor, a magnetic disk 4 made of a glass substrate or an aluminum substrate is fixed by a top clamp 5, and it is rotatably driven counterclockwise by the spindle 3 of the spindle motor. The magnetic disk 4 is a disk-like storage medium for storing data. Data is stored on a magnetic thin film (not shown) formed on the glass or aluminum substrate. The HDD 1 may have two magnetic disks 4 or one magnetic disk 4 mounted thereon. The case in which two magnetic disks 4 are mounted is the full population version, and the case in which one magnetic disk 4 is mounted is the depopulation version.

Further, in the base 2, a head assembly 6 is provided. As shown in FIG. 1 and FIG. 2, the head assembly 6 comprises a pivot shaft holder 7 as a swing shaft, a coil 8 for VCM (voice coil motor) attached to the pivot shaft holder 7, arms 9a–9c attached at predetermined positions opposite to the coil 8 for VCM with respect to the pivot shaft holder 7, suspension arms 10a–10d attached to the end portions of the arms 9a–9c, and magnetic heads 11a–11d attached to the end portions of the suspension arms 10a–10d. In the pivot shaft holder 7, a screw hole 7a is formed for attaching a counter weight 15 to be described later.

The pivot shaft holder 7 is rotatably fitted over a pivot shaft 12 vertically provided on the base 2. Accordingly, the energization of the coil 8 for VCM causes the head assembly 6 to be swung around the pivot shaft 12 by the coil 8 for VCM and a VCM (voice coil motor) stator 13. The VCM is formed of the coil 8 for VCM and the VCM stator 13.

To the outer surface (bottom surface) of the base 2, a card, not shown, as a circuit board is attached, and between the card and the spindle motor, the inputting and outputting of the power, signals and the like for driving the motor are carried out, and between the card and the head assembly 6, the inputting and outputting of the power to the coil 8 for VCM and the power and signals for read/write of the magnetic heads 11a–11d are carried out.

The HDD 1 of this embodiment is a HDD called the head load/unload-type. In the head load/unload-type HDD, by holding the head assembly 6 on a ramp block 14 when it is inoperative, the magnetic heads 11a–11d are unloaded to their retraction positions without putting them in contact with the surfaces of the magnetic disks 4. In operation, the head assembly 6 is driven to cause the magnetic heads 11a–11d to seek on the magnetic disks 4.

FIG. 2 is a perspective view showing the head assembly 6, and the upper portion shows the full population version, while the lower portion shows the depopulation version. As shown in FIG. 2, in the full population version, the suspension arms 10a–10d are respectively attached to all the arms 9a–9c. That is, in the full population version, corresponding to the two magnetic disks 4 mounted, the four magnetic heads 11a–11d are provided. In the full population version, it is designed so that the center of gravity of the head assembly 6 matches its center of rotation, with all the suspension arms 10a–10d and all the magnetic heads 11a–11d being attached. the depopulation version according to this embodiment, the magnetic heads 11c and 11d of the magnetic heads 11a–11d are attached. By the magnetic heads 11c and 11d, data read/write is carried out with respect to the surface and rear of only one magnetic disk 4 mounted. The suspension arms 10a and 10b and the magnetic heads 11a and 11b, which are attached in the full population version, are not attached in the depopulation version as shown in FIG. 2. Accordingly, the center of gravity of the head assembly 6 would deviate from the center of rotation if they are left as they are. Thus, in this embodiment, a counter weight 15 is attached to the pivot shaft holder 7. The weight and installation position of the counter weight 15 are set so that the center of gravity of the head assembly 6 matches its swing center when attached.

In the full population version, generally, if the number of the magnetic disks 4 to be mounted is N, the number of magnetic heads to be attached is 2N. This is because the magnetic disk has data storage layers provided on the surface and rear thereof. Further, in the depopulation version, if the number of the magnetic disks 4 to be mounted is n, the number of magnetic heads to be attached is also 2n, where n<N. This embodiment is characterized by attaching the counter weight 15 to the head assembly 6 of the depopulation version, attaching the counter weight 15 to the pivot shaft holder 7, and attaching the counter weight 15 to the side of the pivot shaft holder 7 on which the arms 9a–9c are existing. This characteristic is detailed below with respect to FIGS. 3 and 4.

Figure 3:
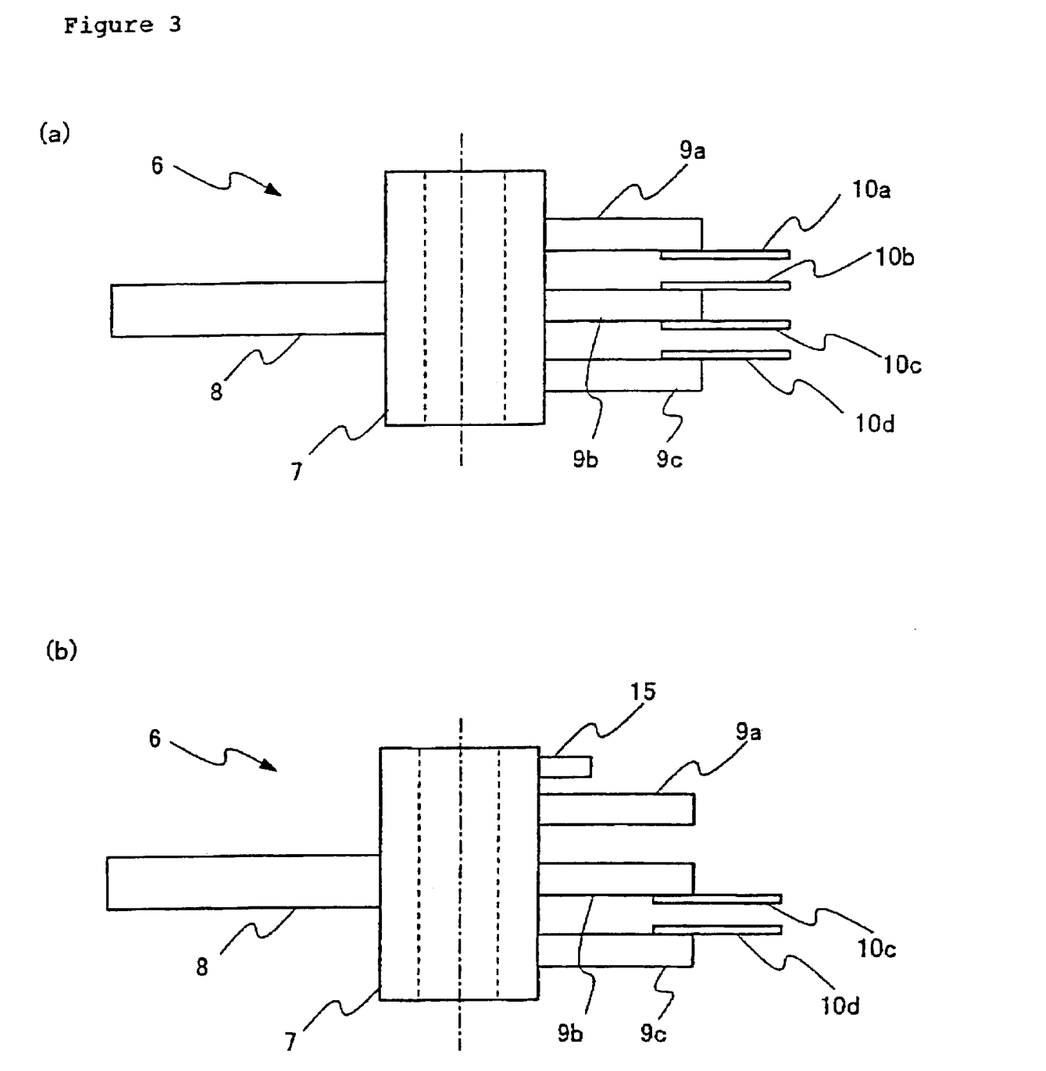
FIG. 3 is a figure diagrammatically showing a side of the head assembly according to the embodiment, and (a) shows a full population version, while (b) shows a depopulation version.
Figure 4:
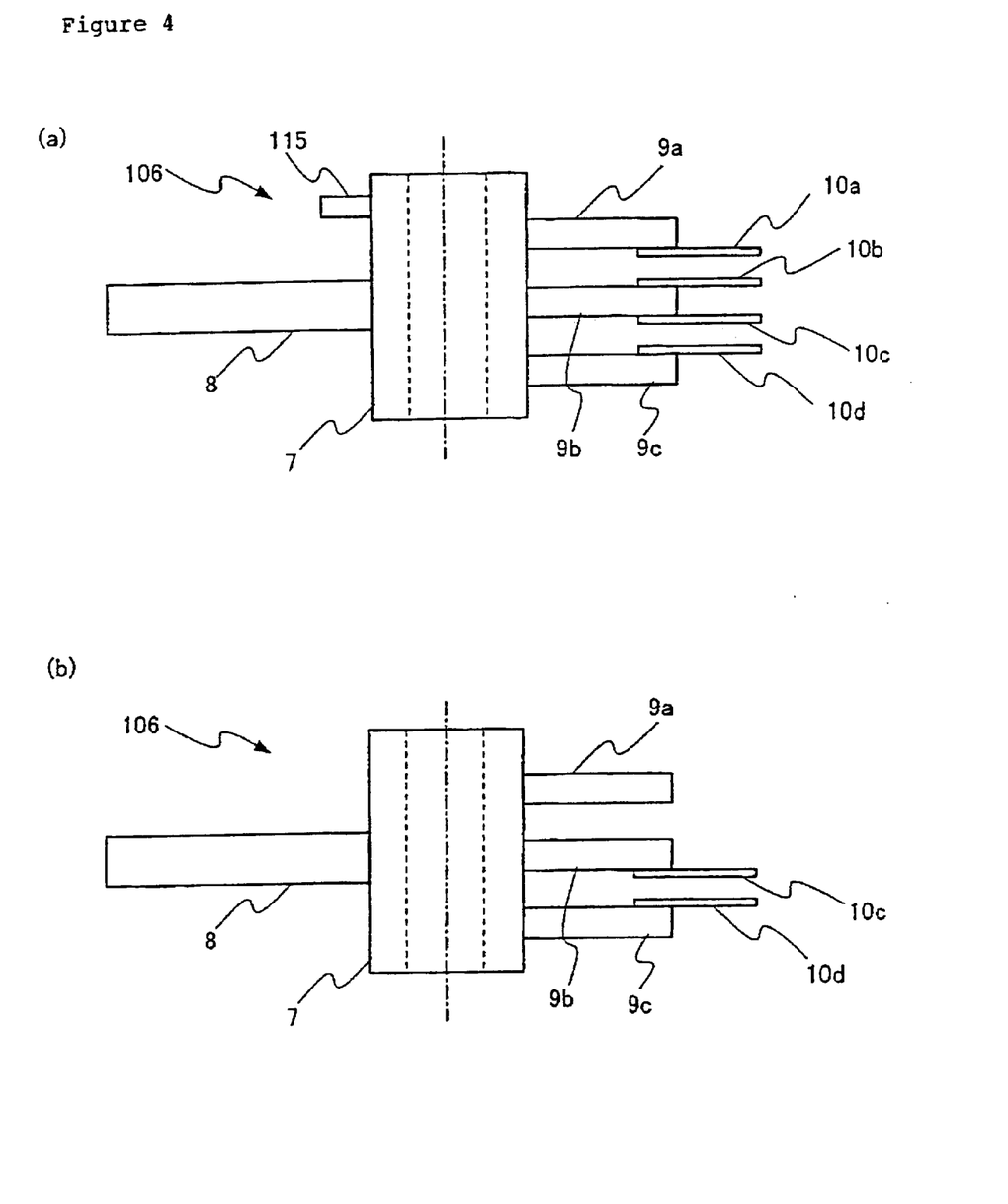
FIG. 4 is a figure diagrammatically showing a side of the head assembly according to a comparison example, and (a) shows the full population version, while (b) shows the depopulation version.

FIG. 3 is a figure diagrammatically showing the side of the head assembly 6 according to this embodiment, and (a) shows the full population version, while (b) shows the depopulation version. On the other hand, FIG. 4 is a figure showing a comparison example for this embodiment, and also, (a) shows the full population version, while (b) shows the depopulation version. In FIG. 4, the same structural elements as this embodiment are assigned the same symbols as this embodiment. Further, in FIGS. 3 and 4, the depiction of the magnetic heads 11a–11d is omitted.

As shown in FIGS. 3(a) and (b), the counter weight 15 is attached for the depopulation version in this embodiment. More specifically, in the depopulation version, to compensate the deviation of the center of gravity due to the absence of the suspension arms 10a and 10b and the magnetic heads 11a and 11b, the counter weight 15 is attached to the side on which the arms 9a–9c are existing. That is, the coil 8 for VCM and the counter weight 15 are disposed on the opposite positions with respect to the pivot shaft holder 7.

On the other hand, as shown in FIGS. 4(a) and (b), in the comparison example, a weight 115 is attached for the full population version. That is, the comparison example is designed so that the center of gravity of the head assembly 106 matches the swing center of it when the weight 115 is attached. And, in the depopulation version, to compensate the deviation of the center of gravity due to the absence of the suspension arms 10a and 10b and the magnetic heads 11a and 11b, the weight 115 is removed. Further, in the comparison example, the weight 115 is attached to the side on which the coil 8 for VCM is existing.

To compare this embodiment with the comparison example, they are different in the point that the counter weight 15 is attached for the depopulation version in the former, while the weight 115 is attached for the full population version in the latter. Now, it is assumed that the specifications of the head assembly 6 according to this embodiment having the counter weight 15 removed and the head assembly 106 according to the comparison example having the weight 115 removed are matching with each other. Then, the moment of inertia of the head assembly 106 of the full population version becomes larger than the head assembly 6 of the full population version for the existence of the weight 115. Accordingly, if VCMs having the same performance are used, the head assembly 6 has a rotating speed faster than the head assembly 106. In other words, the head assembly 6 has a faster speed in seeking the magnetic heads 11a–11d. This means that, for the head assembly 106 to obtain a seek speed equivalent to the head assembly 6, it is required to use a VCM having performance higher than the head assembly 6, hence having a larger size. In the HDD 1, compactness and high performance are also strongly required, and from this point of view, this embodiment is preferred in which the moment of inertia for the full population version is small.

In this embodiment, the counter weight 15 need not be attached in the full population version, because the counter weight 15 is attached in the depopulation version to the side on which the arms 9a–9c are existing. That is, in the depopulation version, by attaching the counter weight 15 to the side on which a weight decrease occurs due to the omission of the suspension arms 10a and 10b and the magnetic heads 11a and 11b, the position of the center of gravity is adjusted. However, if the weight is reduced by omitting the suspension arms 10a and 10b and the magnetic heads 11a and 11b, as in the comparison example, the position of the center of gravity is adjusted by reducing the weight on the side symmetrical to the side on which the weight reduction has occurred. In this technique for adjusting the position of the center of gravity, it is inevitable to attach the counter weight 115 in the full population version.

At the time of grasping from the viewpoint of moment the position at which the counter weight 15 is attached, the counter weight 15 is provided, in this embodiment, so that it gives a moment to the pivot shaft holder 7 in the direction opposite to the direction of the moment effected by the coil 8 for VCM. Further, the moment caused by the counter weight 15 to act on the pivot shaft holder 7 and the moment caused by the arms 9a–9c to act on the pivot shaft holder 7 are coincident in direction.

Figure 6:
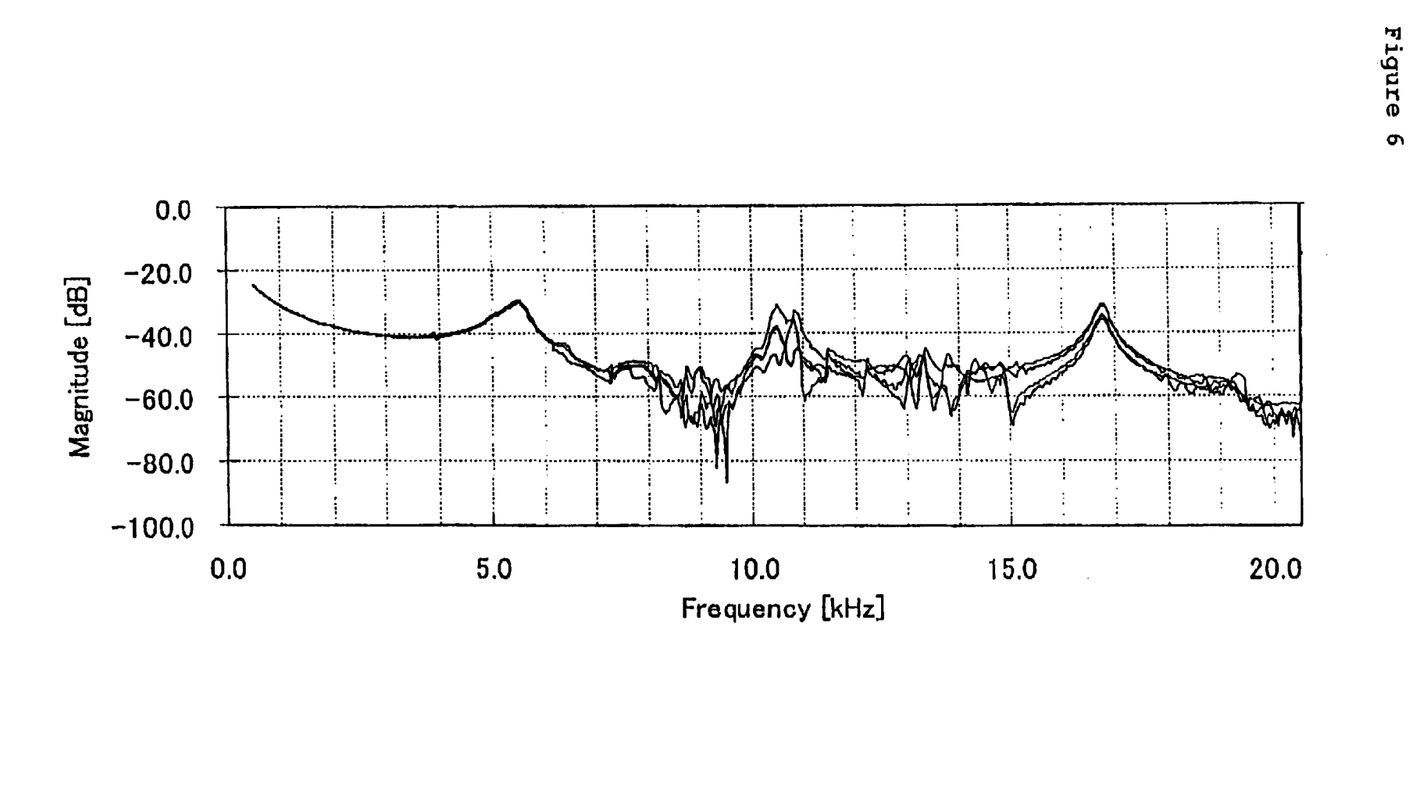
FIG. 6 is a graph showing a frequency characteristic of vibration of the conventional head assembly.
Figure 7:
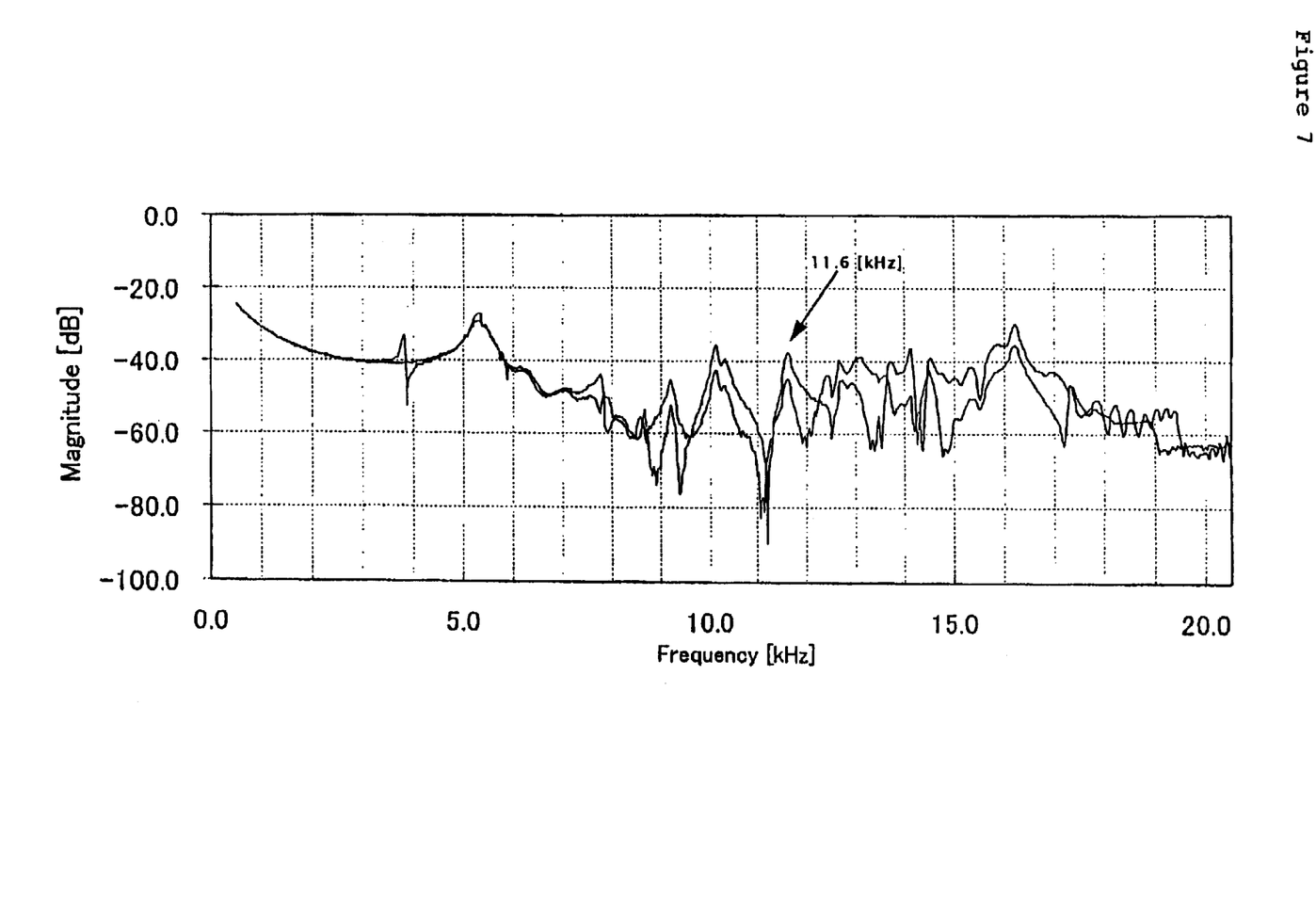
FIG. 7 is a graph showing the frequency characteristic of vibration of the conventional head assembly.
Figure 8:
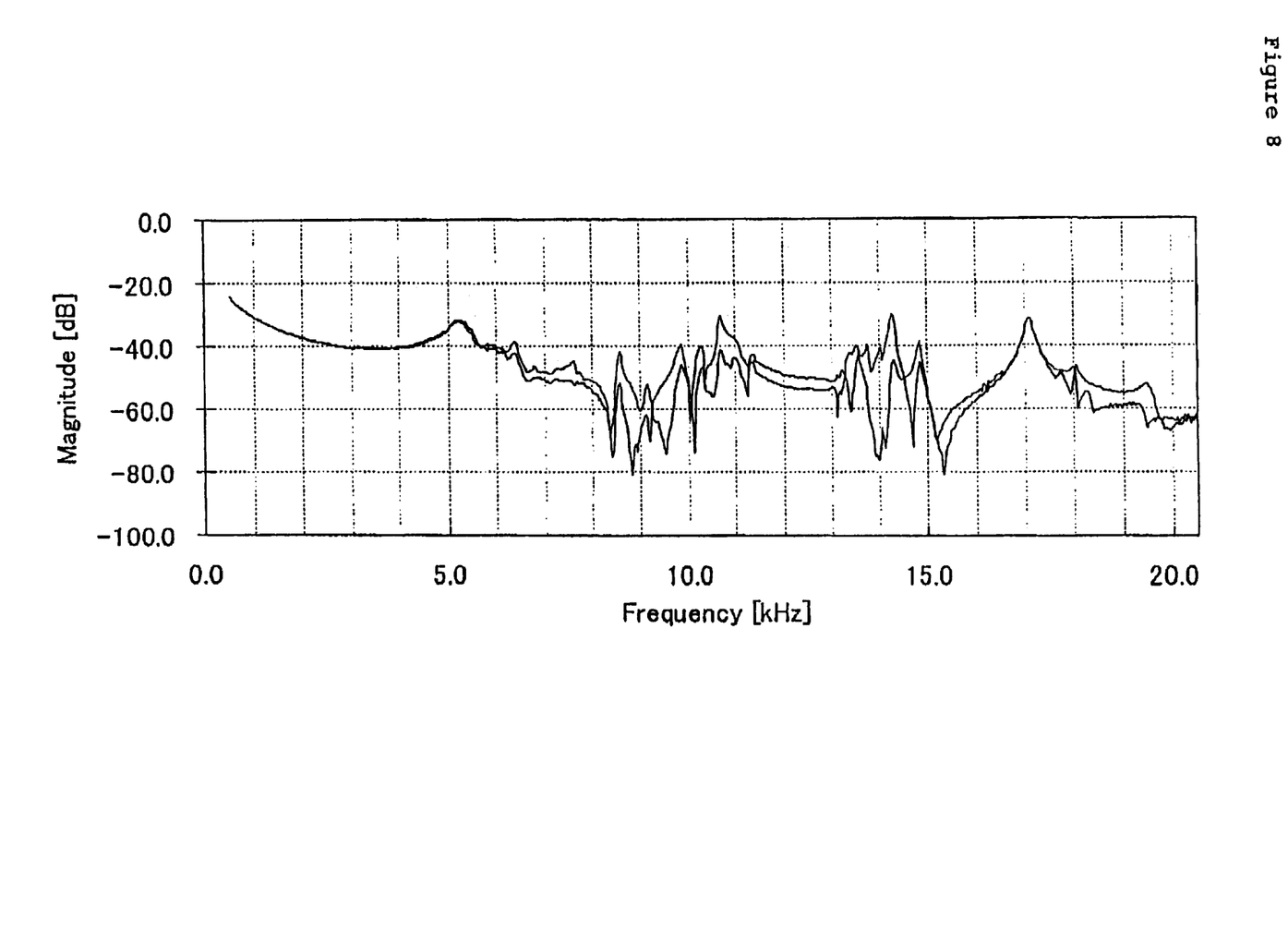
FIG. 8 is a graph showing the frequency characteristic of vibration of the head assembly according to the embodiment.

In the head assembly 6 according to this embodiment, the counter weight 15 is attached to the pivot shaft holder 7 in the depopulation version. That is, the counter weight 15 is disposed in the vicinity of the swing center of the head assembly 6 as compared with the dummy heads 261 and 262 shown in FIG. 5. By disposing the counter weight 15 in the vicinity of the swing center of the head assembly 6 in this way, the occurrence of a new resonance frequency degrading the performance of the HDD 1 is suppressed. FIGS. 6 to 8 are showing data that verifies this. FIGS. 6 to 8 are graphs all showing the vibration change vs. the input frequency of the head assembly 6; FIG. 6 shows the characteristic of the full population version (four magnetic heads), FIG. 7 shows the characteristic of the depopulation version using the dummy heads 261 and 262, and FIG. 8 shows the characteristic of the depopulation version according to this embodiment.

In FIGS. 6 to 8, the frequency band affecting the characteristic of the HDD 1 is 10 to 15 kHz. As shown in FIG. 7, in the depopulation version using the dummy heads 261 and 262, a resonance frequency of 11.6 kHz appears, which is not seen in the full population version shown in FIG. 6. This is a new resonance frequency that is not desirable for the characteristic of the HDD 1. On the other hand, the graphic chart according to this embodiment shown in FIG. 8 shows a tendency closely analogous to the graphic chart of FIG. 6 showing the full population version, and no new resonance frequency cannot be observed in the band of 10 to 15 kHz. Accordingly, in accordance with this embodiment, the head assembly 6 that is also desirable in the viewpoint of acoustics is provided.

As described above, in this embodiment, the counter weight 15 is not attached for the full population version, and the counter weight 15 is attached to the head assembly 6 of the depopulation version, thereby contributing to the increase in the seek speed of the magnetic heads 11a–11d. In addition, by attaching the counter weight 15 to the side of the pivot shaft holder 7 on which the arms 9a–9c are existing, the occurrence of a new resonance frequency can be suppressed.

The present invention has advantages over the prior art. As described above, in accordance with the present invention, the center of gravity of the head assembly of the depopulation version can be adjusted, while suppressing the occurrence of a resonance frequency affecting the performance of the disk drive apparatus.

While the present invention has been shown or described in only some of its forms, it should be apparent to those skilled in the art that it is not so limited, but is susceptible to various changes without departing from the scope of the invention.

What is claimed is:

1. A head assembly for data storage device, comprising:
   a data storage media;
   a plurality of arms, each having a head for reading data from and writing data to the data storage media;
   a swing shaft for supporting the plurality of arms and defining a swing shaft axis about which the swing shaft pivots;
   a coil for a voice coil motor extended from the swing shaft on one side of the swing shaft axis;
   a counter weight set at a predetermined position on the swing shaft which is opposite the coil with respect to the swing shaft axis; and
   the head assembly having a populated configuration so that each of the plurality of arms has a head attached thereto and the counter weight is attached to the swing shaft, and a depopulated configuration so that only some of the plurality of arms has a head attached thereto and the counter weight is detached from the swing shaft.

2. A head assembly for a data storage device, comprising:
   a data storage media;
   a swing shaft that defines a swing shaft axis at a center of a swing motion;
   a coil for a voice coil motor extended from the swing shaft on one side of the swing shaft axis;
   a plurality of arms extended from the swing shaft opposite the coil on another side of the swing shaft axis;
   a head mounted to each of the plurality of arms, each of the heads for reading data from and writing data to the data storage media;
   a counter weight set at a predetermined position on the swing shaft, for giving a moment to the swing shaft in a direction opposite to a direction of a moment effected by the coil; and
   the head assembly having a populated configuration so that each of the plurality of arms has a head attached thereto and the counter weight is attached to the swing shaft, and a depopulated configuration so that only some of the plurality of arms has a head attached thereto and the counter weight is detached from the swing shaft.

3. A disk dive apparatus, comprising:
   a plurality of data storage media; and
   a swing-type head assembly fiber reading data from and writing data to the plurality of data storage media; wherein the head assembly comprises:
      a plurality of arms, each having a head for reading data from and writing data to the data storage media;
      a swing shaft for supporting the plurality of arms in a first direction;
      a coil for a voice coil motor extended from the swing shaft in a second direction that is opposite to the first direction; and
      a counter weight removably coupled to the swing shaft and extending in the first direction; and
   the disk drive having a populated configuration so that each of the plurality of arms has a head attached thereto and the counter weight is attached to the swing shaft, and a depopulated configuration so that only some of the plurality of arms has a head attached thereto and the counter weight is detached from the swing shaft.

4. The disk drive apparatus of claim 3, wherein the counter weight is set at a position so as to give a moment to the swing shaft in a direction opposite to a direction of a moment effected by the coil.

5. The disk drive apparatus of claim 3, wherein the counter weight is formed of a single member.

6. A hard disk drive, comprising:
   a plurality of magnetic disks; and
   a swing-type head assembly for reading data from and writing data to the magnetic disks, wherein the head assembly includes:
      a plurality of arms, each having magnetic heads for reading data from and writing data to the magnetic disks;
      a swing shaft for supporting the plurality of arms;
      a coil for a voice coil motor extended from the swing shaft;
      a counter weight removably coupled to the swing shaft for changing a moment of inertia of the swing-type head assembly; and
   the hard disk drive having a populated configuration so that each of the plurality of arms has a head attached thereto and the counter weight is attached to the swing shaft, and a depopulated configuration so that only some of the plurality of arms has a head attached thereto and the counter weight is detached from the swing shaft.

7. A method of counterbalancing a disk drive apparatus, comprising the steps of:
   providing a disk drive apparatus with a head assembly for reading data from and writing data to a data storage media, wherein the disk drive apparatus has a plurality of the media stacked therein, a swing shaft, and a plurality of heads for reading from and writing to the plurality of media;
   attaching a counter weight adjacent to the swing shaft for causing the swing shaft to match a center of gravity in the head assembly when the disk drive apparatus is one of completely populated with heads and partially populated with heads.

8. The method of claim 7, further comprising the step of attaching the counter weight at a predetermined position on the swing shaft where a moment is given in a same direction as a moment caused to act on the swing shaft by the arm.

9. The method of claim 7, wherein the counter weight is attached when the disk drive apparatus is partially populated with heads, and wherein the counter weight is located on a same side of the swing shaft as the plurality of heads.

10. The method of claim 7, wherein the counter weight is attached when the disk drive apparatus is completely populated with heads, and wherein the counter weight is located on a side of the swing shaft that is opposite to the plurality of heads.

* * * * *

UNITED STATES PATENT AND TRADEMARK OFFICE
CERTIFICATE OF CORRECTION

PATENT NO.     : 6,532,137 B2
DATED          : March 11, 2003
INVENTOR(S)    : Huang et al.

It is certified that error appears in the above-identified patent and that said Letters Patent is hereby corrected as shown below:

Column 6,
Line 64, please insert -- In -- before "the depopulation version according..."

Column 10,
Line 4, please replace "fiber" with -- for --.

Signed and Sealed this

Second Day of September, 2003

JAMES E. ROGAN
*Director of the United States Patent and Trademark Office*